Patented July 7, 1936

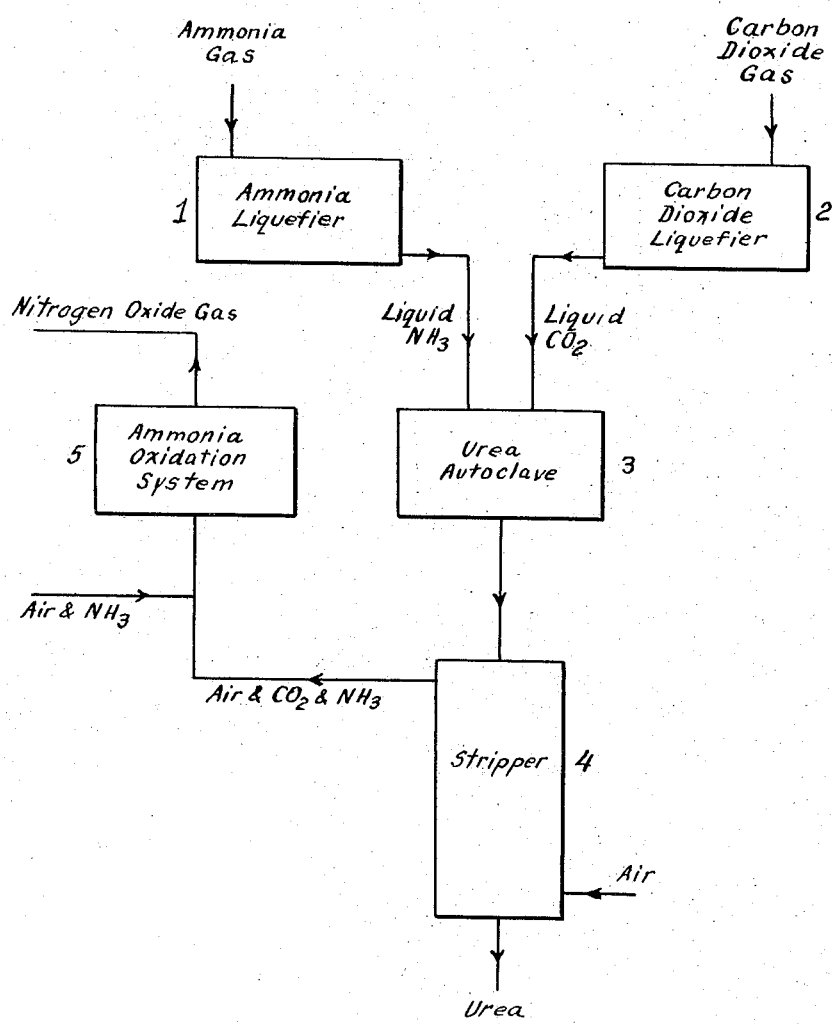

2,046,827

UNITED STATES PATENT OFFICE 2,046,827

PRODUCTION OF UREA AND NITROGEN OXIDES

Charles K. Lawrence, Syracuse, N. Y., and Herman A. Beekhuis, Jr., Petersburg, Va., assignors to Atmospheric Nitrogen Corporation, New York, N. Y., a corporation of New York Application August 9, 1933, Serial No. 684,300

4 Claims. (Cl. 23—162)

This invention relates to a process for the production of urea and nitrogen oxides from ammonia and carbon dioxide.

It is known that ammonia and carbon dioxide, when heated under pressure, react to form urea. This reaction may be expressed by the equation

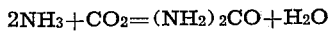

$$2NH_3 + CO_2 = (NH_2)_2CO + H_2O$$

This reaction resulting in the formation of urea from ammonia and carbon dioxide does not go to completion under conditions practicable for commercial operations so that, when ammonia and carbon dioxide are heated under pressure, the reaction product obtained consists not only of urea and water but also contains a considerable proportion of ammonia and carbon dioxide, more or less of which may be present in the form of ammonium carbamate or carbonates, together with products other than those stated which are formed by side reactions taking place simultaneously with the reaction forming urea. Numerous methods have been proposed for treating the melt obtained from urea synthesis systems to recover the ammonia and carbon dioxide for re-use to form additional urea, but the recovery of this ammonia and carbon dioxide still presents one of the major problems in the commercial production of urea.

It is also known to oxidize ammonia by means of an oxygen gas such as air, air enriched with oxygen, and the like, to form nitrogen oxides and water.

It is an object of this invention to provide a process for the production from ammonia and carbon dioxide of both urea and nitrogen oxides whereby the more valuable of the two raw materials (the ammonia) may be completely utilized and recovered in the form of urea and nitrogen oxides, in a particularly economical manner with respect to the installation and operating costs for a plant required for the production of these two materials.

In carrying out the process of this invention a mixture of ammonia and carbon dioxide is subjected to urea-forming pressures and temperatures to obtain a product containing urea, ammonia, carbon dioxide and water. From this product the ammonia and carbon dioxide are recovered separately from the urea and the ammonia and carbon dioxide, together with a desired proportion of oxygen, are passed at an elevated temperature in contact with a catalyst active to promote the oxidation of the ammonia to form nitrogen oxides.

The accompanying drawing shows diagrammatically one process illustrative of this invention. The apparatus of the drawing comprises an ammonia liquefier 1, (which may be a part of an ammonia synthesis system in which liquefier 1 serves to condense liquid ammonia from the synthesis gases), a carbon dioxide liquefier 2, a urea autoclave 3, a stripper 4 and an ammonia oxidation system 5. Ammonia gas introduced into liquefier 1 may be compressed and cooled to form liquid ammonia which is pumped into autoclave 3. At the same time carbon dioxide gas is introduced into liquefier 2 where it is compressed and liquefied and is also introduced into autoclave 3. While maintaining the materials in the autoclave under a pressure of, for example, 100 to 300 atmospheres, they are heated in the autoclave at about 150° to 200° C. to promote the formation of urea from the ammonia and carbon dioxide. The liquid ammonia and liquid carbon dioxide are continuously introduced into the autoclave and a melt containing urea, ammonia and carbon dioxide is continuously withdrawn therefrom and passed into the top of tower 4, which serves as a stripper. Tower 4 is operated at a pressure materially below that of autoclave 3; for example, a pressure of a few pounds gauge, and as the effluent from the autoclave at an elevated temperature is introduced into tower 4 at the lower pressures, ammonia and carbon dioxide gas are evolved from the melt. Air is introduced into the bottom of tower 4 and passed upwardly in contact with the autoclave effluent which passes downwardly through the tower. This air may be heated prior to introduction into the tower or, if desired, the tower may be provided with a heater in the bottom to heat the air. Steam may be introduced with the air entering the bottom of the tower in the proportions, for example, of 1 volume of steam to 7 volumes of air. If desired, this steam may be introduced into the tower at an intermediate point instead of into the bottom of the tower. As the air passes upwardly through the tower in contact with the warm liquor, which at the top of the tower may have a temperature of, for example, about 100° C., the ammonia and carbon dioxide are desorbed from the liquor and the mixture of air, ammonia and carbon dioxide thus obtained is withdrawn from the top of tower 4 and passed to ammonia oxidation system 5 while maintaining the gas mixture at a temperature sufficiently high to prevent the condensation of ammonium carbamate or carbonate.

With ammonia and carbon dioxide introduced in stoichiometric proportions into the autoclave (2 mols of ammonia for every 1 mol. of carbon dioxide) the resulting urea-containing melt, when subjected to the reduced pressure in tower 4, will evolve a gas containing about 2 volumes of ammonia for every 1 volume of carbon dioxide. Under such conditions the air may be introduced into tower 4 in amount equivalent to about 700 cubic feet of air for every 100 cubic feet of ammonia and carbon dioxide taken together which are absorbed by the air from the effluent liquor entering the tower. The resulting carbon dioxide-ammonia-air mixture may be passed in contact with an ammonia oxidation catalyst and the nitrogen oxides formed absorbed in water to obtain nitric acid, or utilized in any other desired manner. The solution containing urea which is drawn from the bottom of tower 4 may be treated to recover solid urea or otherwise utilized as desired.

The foregoing procedure may be modified as follows: A mixture of urea, ammonia, carbon dioxide and water produced in autoclave 3 as described above, is passed continuously into tower 4 into the bottom of which air is introduced at such rate that the gas taken off from the top of the tower contains about 8½% of ammonia by volume together with carbon dioxide. This ammonia-carbon dioxide-air mixture is then diluted with an equal volume of a mixture of ammonia and air containing about 9% ammonia. The mixed gas is oxidized in the usual manner by passing it in contact with an ammonia oxidation catalyst many of which are known to the art. The resulting gas containing nitrogen oxides may be employed for the production of nitrates such as sodium nitrate or calcium nitrate by absorption of the nitrogen oxides in solutions or slurries of sodium carbonate or calcium carbonate. This modification of the invention is particularly of value when the quantity of ammonia which it may be desired to convert into nitrogen oxides is greater than that available from the production of the desired quantity of urea. When air is employed in stripping the ammonia and carbon dioxide from the urea autoclave effluent, a relatively large volume of air may be passed in contact with the effluent to obtain a relatively dilute ammonia-air mixture and a concentrated ammonia gas added to the mixture to obtain a desired ratio of ammonia to oxygen for the ammonia oxidation. In thus operating, the use of a large amount of air facilitates stripping the urea effluent of its ammonia-carbon dioxide content at relatively low temperatures.

If more ammonia is available from the urea synthesis step than it is desired to convert to nitrogen oxides, a part of the ammonia may be utilized for the production of ammonium salts by reaction with nitric acid which may be recovered from the nitrogen oxide gas, or a part of the ammonia and, if desired, the carbon dioxide may be returned to the urea process itself.

Numerous modifications and changes may be made in the foregoing examples without departing from the scope of this invention. A gas suitable for catalytic treatment for the oxidation of its ammonia content may be prepared in accordance with the process of this invention by introducing ammonia and carbon dioxide into the urea autoclave in stoichiometric proportions, recovering from the resulting product the unconverted ammonia and carbon dioxide and mixing with the recovered gases a desirable proportion of oxygen. The urea synthesis product may be heated, for example, by introduction thereinto of steam to evolve the ammonia and carbon dioxide, and this gas passed to a mixing vessel through a conduit heated sufficiently to prevent condensation of ammonium carbamate or carbonate. Air sufficiently warm to prevent the formation of ammonium carbamate or carbonate is also fed into the mixing vessel in such amount as to give a gas mixture containing the desired ratio of ammonia and oxygen. The temperatures required to prevent a condensate of ammonium carbamate forming from the ammonia carbon dioxide containing gas depends upon the partial pressures of the ammonia and carbon dioxide in the gas. For example, for a pure $NH_3$—$CO_2$ gas at 1 atmosphere pressure no solid ammonium carbamate forms at temperatures above about 55° C.

The air for ammonia oxidation may be passed either with or without preheating it through the tower into which the urea synthesis product is passed as described above. If desired, a part of the air may be utilized for stripping the effluent of its ammonia-carbon dioxide content while the balance of the air may be mixed with the gas from the stripper in a mixing vessel in the manner described above.

Instead of utilizing directly the ammonia-carbon dioxide gas recovered from the urea synthesis melt for oxidation of the ammonia, the gas evolved from the melt may be first absorbed in water to form an aqueous ammonium carbonate solution which may be passed in contact with air to form a gas mixture suitable for ammonia oxidation. The solution from which the ammonium carbonate has been recovered may be reutilized for the absorption of further quantities of gas recovered from the urea synthesis effluent.

In general, it is desirable that the gas introduced into contact with the ammonia oxidation catalyst contain oxygen and ammonia in a ratio corresponding to that obtained by mixing 1 volume of ammonia with 10 volumes of air which gives a gas containing approximately 1 volume of ammonia for every 2 volumes of oxygen, and it is preferred in carrying out the process of this invention to mix the ammonia-carbon dioxide gas obtained from the urea synthesis melt with sufficient oxygen gas either as air, oxygen or oxygen enriched air to give a mixture containing this ratio of ammonia and oxygen. While, as noted above, in using stoichiometric proportions of ammonia and carbon dioxide for the urea synthesis process, the gas recovered would contain 2 volumes of ammonia for every 1 volume of carbon dioxide, if desired, the ratio of ammonia to carbon dioxide in the recovered gas may be increased or decreased by increasing or decreasing respectively the ratio of ammonia to carbon dioxide introduced into the urea autoclave.

The ammonia introduced into the urea autoclave may be liquid ammonia taken directly and under pressure from the liquefiers of an ammonia synthesis process. If the pressure in the urea autoclave is higher than that at which the liquid ammonia is obtained from the ammonia synthesis plant, the ammonia may be pumped into the urea autoclave. If ammonia gas is to be used, this may be condensed in the urea autoclave itself instead of in a separate ammonia condensing unit such as shown in the drawing and described above.

It is particularly of advantage to employ in this process the liquid ammonia which is first condensed in a circulatory ammonia synthesis process, particularly one in which the liquid ammonia is employed to absorb impurities from fresh make-up gas introduced into the ammonia synthesis system.

This first liquid ammonia condensate contains relatively large proportions of impurities which, however, are not detrimental to its use for the production of urea, while the procedure to which the ammonia is subjected in the urea synthesis serves to remove impurities which may be detrimental to an ammonia oxidation catalyst. Under these circumstances, where an impure liquid ammonia is to be treated, the urea synthesis may be regarded in part as a purification treatment of that portion of the ammonia which is passed on from the urea synthesis to the ammonia oxidation system.

The carbon dioxide utilized in this process may be the gas recovered by scrubbing with water a crude ammonia synthesis gas containing hydrogen, nitrogen and carbon dioxide. As is well known in the art, the hydrogen in such a gas is formed by the reaction of steam with a fuel of the type of coal, coke and hydrocarbon gases. The carbon dioxide gas may be purified, if necessary, to remove constituents which are objectionable either in the urea synthesis or in the subsequent oxidation of ammonia. The gas may be pumped directly into the urea autoclave, or it may be liquefied in a separate liquefier as described above and pumped as a liquid into the urea autoclave. The carbon dioxide utilized may also be the gas recovered in suitable manner from the calcination of carbonates such as limestone or from the combustion products of coal, coke, etc. The carbon dioxide from these sources, either with or without purification, may be compressed, liquefied and pumped into the urea autoclave. Solid carbon dioxide may be liquefied and utilized for the production of the urea.

The production of urea and of nitrogen oxides in accordance with the process of this invention has advantages both with respect to the production of the urea and to the oxidation of ammonia. Thus, a urea process operated alone must be operated to give the maximum conversion of ammonia and carbon dioxide to urea. On the other hand, in the process of this invention wherein the ammonia unconverted in the urea synthesis step is utilized for the production of nitrogen oxides, the conditions under which the urea synthesis is operated need not be those conditions giving the maximum conversion to urea. Instead, this step may be operated under more favorable conditions as to the capital costs of the plant, corrosion and formation of undesirable by-products. While the urea synthesis step may be operated employing stoichiometric proportions of ammonia and carbon dioxide, this may be varied to employ an excess of ammonia or, if desired, an excess of carbon dioxide over the ratio of 2NH$_3$ to 1CO$_2$. It is desirable from some aspects to employ for urea synthesis an excess of ammonia. In employing the process of this invention, such an excess of ammonia may be used in the urea synthesis as would be uneconomical in other procedures because of the expense involved in the recovery of the excess ammonia. This process is further of particular value where it is desired to make compound fertilizer materials containing both urea and nitrate nitrogen. For example, the nitrogen oxide gas may be treated to obtain nitric acid which may be reacted with the urea to form urea nitrate. Again, the nitric acid may be reacted with calcium carbonate or the nitrogen oxide gases may be directly absorbed in calcium carbonate to form calcium nitrate, which may be combined with the urea to form a mixed urea-calcium nitrate product. If, however, substances poisonous to the ammonia oxidation catalyst are present in either the ammonia or the carbon dioxide gases to be treated in accordance with this invention, and these poisons are of such a character that they are present in the gas recovered from the urea synthesis effluent, they should be removed from the gases before their introduction into contact with the ammonia oxidation catalyst.

We claim:

1. The process for the production of urea and nitrogen oxides which comprises reacting ammonia and carbon dioxide to form a product containing urea, water, ammonia and carbon dioxide, passing air in contact with said product at a temperature at which the ammonia and carbon dioxide are evolved from the reaction product to form a gaseous mixture containing oxygen, ammonia and carbon dioxide, and passing said gaseous mixture in contact with an ammonia oxidation catalyst to oxidize the ammonia to nitrogen oxides.

2. The process for the production of urea and nitrogen oxides which comprises reacting ammonia and carbon dioxide in stoichiometric proportions to form a product containing urea, water, ammonia and carbon dioxide, passing air in contact with said product at a temperature of about 100° C. and in amount equivalent to about 700 cubic feet of air for every 100 cubic feet of ammonia and carbon dioxide taken together absorbed by the air from said product, maintaining the resulting gaseous mixture at a temperature above that at which solid products of carbon dioxide and ammonia condense therefrom, and passing the mixture in contact with an ammonia oxidation catalyst to oxidize the ammonia to nitrogen oxides.

3. The process for the production of urea and nitrogen oxides which comprises reacting ammonia and carbon dioxide to form a product containing urea, water, ammonia and carbon dioxide, the ammonia being present in excess of the amount required for reaction with the carbon dioxide to form urea, passing air in contact with said product at a temperature at which the ammonia and carbon dioxide are evolved from the reaction product to form a gaseous mixture containing oxygen, ammonia and carbon dioxide, and passing said gaseous mixture in contact with an ammonia oxidation catalyst to oxidize the ammonia to nitrogen oxides.

4. The process for the production of urea and nitrogen oxides which comprises reacting ammonia and carbon dioxide under optimum conditions of temperature and pressure for promoting the production of urea independent of the proportion of ammonia and carbon dioxide treated which is converted into urea thereby forming a product containing urea, water, ammonia and carbon dioxide, passing air in contact with said product at a temperature at which ammonia and carbon dioxide are evolved from the reaction product to form directly a gaseous mixture containing oxygen, ammonia and carbon dioxide in which the proportions of ammonia and oxygen are suitable for catalysis of the gaseous mixture to oxidize the ammonia, and passing said gaseous mixture in contact with an ammonia oxidation catalyst to oxidize the ammonia to nitrogen oxides.

CHARLES K. LAWRENCE.
HERMAN A. BEEKHUIS, Jr.